US010861166B2

(12) United States Patent
Riaz et al.

(10) Patent No.: US 10,861,166 B2
(45) Date of Patent: Dec. 8, 2020

(54) IMAGE RESTORATION METHOD

(71) Applicant: SAFRAN ELECTRONICS & DEFENSE, Paris (FR)

(72) Inventors: Anum Riaz, Paris (FR); Arnaud Woiselle, Paris (FR); Joël Budin, Paris (FR)

(73) Assignee: SAFRAN ELECTRONICS & DEFENSE, Paris (FR)

(*) Notice: Subject to any disclaimer, the term of this patent is extended or adjusted under 35 U.S.C. 154(b) by 0 days.

(21) Appl. No.: 16/757,975

(22) PCT Filed: Oct. 24, 2018

(86) PCT No.: PCT/EP2018/079174
§ 371 (c)(1),
(2) Date: Apr. 21, 2020

(87) PCT Pub. No.: WO2019/081587
PCT Pub. Date: May 2, 2019

(65) Prior Publication Data
US 2020/0279376 A1  Sep. 3, 2020

(30) Foreign Application Priority Data
Oct. 27, 2017  (FR) ..................... 17 60144

(51) Int. Cl.
*G06T 7/215* (2017.01)
*G06T 7/12* (2017.01)
(Continued)

(52) U.S. Cl.
CPC .............. *G06T 7/215* (2017.01); *G06T 5/002* (2013.01); *G06T 5/50* (2013.01); *G06T 7/12* (2017.01);
(Continued)

(58) Field of Classification Search
CPC .......... G06T 7/215; G06T 7/12; G06T 7/194; G06T 7/149; G06T 5/002; G06T 5/50;
(Continued)

(56) References Cited

U.S. PATENT DOCUMENTS 7,440,634 B2 * 10/2008 Ben-Ezra ............. H04N 5/2258
382/255
8,588,551 B2  11/2013 Joshi et al.
(Continued)

OTHER PUBLICATIONS

Youssef Zinbi et al.; "Extraction d'objets vidéo : Une approche combinant les contours actifs et le flot optique;" GREYC-URA CNRS 6072; Université de Caen; Jan. 1, 2006; pp. 41-46; XP55627337.
(Continued)

*Primary Examiner* — Leon Viet Q Nguyen
(74) *Attorney, Agent, or Firm* — Oliff PLC; R. Brian Drozd

(57) ABSTRACT

A method for restoring images in a sequence of images, including, when it is applied to a first image in the image sequence: estimating an item of information representing a global motion of a background of the first image with respect to a second image; compensating for said global motion of the background in the second image in order to obtain an adjusted version of the second image, referred to as the adjusted second image; obtaining a contour of an object of the first image by applying a segmentation method using the adjusted second image; using the contour of the object thus obtained in order to estimate an item of information representing a global motion of the object; and applying to the first image an image restoration method using the information representing the estimated global motion of the background and the estimated global motion of the object.

14 Claims, 4 Drawing Sheets

(51) Int. Cl.
G06T 7/194 (2017.01)
G06T 7/149 (2017.01)
G06T 5/00 (2006.01)
G06T 5/50 (2006.01)

(52) U.S. Cl.
CPC .............. *G06T 7/149* (2017.01); *G06T 7/194* (2017.01); *G06T 2207/20116* (2013.01); *G06T 2207/20192* (2013.01)

(58) Field of Classification Search
CPC ........... G06T 2207/20116; G06T 2207/20192; G06K 9/32; G06K 9/36; G06K 9/40
See application file for complete search history.

(56) References Cited

U.S. PATENT DOCUMENTS

2010/0008424 A1* 1/2010 Pace .................... H04N 19/433
375/240.16
2017/0006211 A1* 1/2017 Gurbuz .............. H04N 5/23219

OTHER PUBLICATIONS

Mar. 10, 2020 International Preliminary Report on Patentability issued in Internatoinal Patent Application No. PCT/EP2018/079174.
Matsushita, Yasuyuki et al., "Full-Frame Video Stabilization", Proceedings 1 2005 IEEE Computer Society Conference On Computer Vis Ion And Pattern Recognition, CVPR 2005: [Jun. 20-25, 2005, San Diego, CA], IEEE, Piscataway, NJ , USA, vol. 1 , (Jun. 20, 2005), pp. 50-57.
Wang, Ruxin et al., "Recent Progress in Image Deblurring", Centre for Quantum Computation & Intelligent Systems Faculty of Engineering & Information Technology, (Sep. 24, 2014), XP055485738, Retrieved from the Internet: URL: https://arxiv .org/pdf/1409.6838 [retrieved on Jun. 19, 2018].
Hoover, "Lecture Notes: Active Contours", Aug. 22, 2017 (Aug. 22, 2017), XP055486620, Retrieved from the Internet: URL: http://cecas.clemson.edu/-ahoQverjece431/1ecture-notesj, [retrieved on Jun. 21, 2018].
Nov. 23, 2018 Search Report issued in International Patent Application No. PCT/EP2018/079174.

* cited by examiner

IMAGE RESTORATION METHOD

The invention relates to a method for restoring images in a sequence of images, and a device implementing said method.

Some applications use images or sequences of images requiring a very high image quality. This is the case for example with surveillance applications where a low image quality may give rise to faulty interpretations of an image and, for example, triggerings of false alarms. The restoration of images consists of improving a quality of an image by applying thereto various image processing techniques such as noise reduction or suppression techniques, contour improvement techniques, contrast improvement techniques, etc.

An image in a sequence of images (i.e. in a video sequence) is a particular image case since this image is generally visually similar to images adjacent in time in the sequence of images. A device for the acquisition of sequences of images, such as a video camera, in fact generally has an image acquisition frequency that is sufficiently high for temporal correlations to remain between successive images in a sequence of images. Used judiciously, these temporal correlations may enable an image to benefit from improvements afforded to one or more adjacent images by means of image restoration methods. However, identifying temporal correlations existing between images is not always an easy task. This is in particular the case when a sequence of images represents at least one object in motion on a background itself in motion, the background then being able to be considered to be an object. In order to be able to benefit effectively from temporal correlations existing between two images, it is desirable to take into account the motions of the object and the motions of the background. Known image restoration methods comprising objects in motion comprise a motion analysis phase. This motion analysis phase makes it possible to match pixels correlated between two images. An improvement afforded to a first pixel of a first image may then benefit a second pixel of a second image correlated with the first pixel. The motion analysis phase generally uses optical stream techniques comprising an estimation of a dense motion field wherein each pixel (or at least a subset of pixels) of an image to be restored is associated, by a motion vector, with a pixel of a reference image with respect to which the motion is determined. These image restoration techniques are considered to be insufficiently reliable to allow a quality image restoration. In addition, an estimation of a dense motion field has a high computing cost. Such a computing cost is not compatible with certain embedded or portable systems liable to use image restoration methods, such as video cameras, digital binoculars, augmented reality spectacles, etc. It is therefore in general preferred to replace, during the motion analysis phase, the techniques for estimation of a dense motion field with motion analysis techniques having a lower computing cost, such as global motion estimation techniques. Global motion estimation techniques are particularly effective when an assumption of stationarity of the scenes represented by the sequence of images is satisfied.

Moreover, following the motion analysis, the same image restoration method is generally applied to each pixel of the image to be restored. However, not all the pixels of an image have equal interest. It is usual in fact for an image to represent an object and a background. Obtaining a detailed visual rendition of the object is useful, for example, when the object must be identified precisely, whereas, in the best of cases, the background is useful only for situating the object in a context. Image restoration methods are known wherein the motion analysis phase is followed by a segmentation of the image. The segmentation of the image makes it possible to divide the image into homogeneous subparts in accordance with a predefined criterion. Knowing the subparts constituting the image, it is possible to apply an image processing that is effective to a greater or lesser extent (and therefore with greater or lesser complexity) according to the interest of each subpart. When the segmentation follows an estimation of a dense motion field, this segmentation may rely on the dense field obtained for dividing the image into homogeneous subparts in the direction of the motion. This segmentation method may however give approximate results, in particular when the dense motion field is noisy.

Other segmentation methods exist, such as for example the active contour based segmentation methods. However, these methods are generally intended for fixed images and, when they are applied to images in a sequence of images, they make little (or no) use of the temporal correlations existing between the images.

It is desirable to overcome these drawbacks of the prior art.

It is in particular desirable to propose an image restoration method and device suited to images comprising objects in motion. It is also desirable for this method and this device to be suited to images where the background of the image is itself in motion. Finally, it is desirable for said method to have a low computing cost and to be able to be implemented by a system having low computing capacities such as an embedded or portable system.

According to a first aspect of the invention, the invention relates to a method for restoring images in a sequence of images comprising, when it is applied to a first image in the sequence of images:

estimating an item of information representing a global motion of a background of the first image with respect to a second image;

compensating for the global motion of the background in the second image using said item of information representing the global motion of the background in order to obtain an adjusted version of the second image, referred to as the adjusted second image;

obtaining a contour of an object in the first image by applying a segmentation method, said segmentation method being iterative and comprising, during an iteration, a modification of a contour of the object in the first image obtained during a previous iteration of said segmentation method, referred to as the previous contour, so as to obtain a contour of the object in the first image, referred to as the current contour, such that a cost of the current contour is lower than a cost of the previous contour, a final contour of the object being obtained when a predefined condition for stoppage of said segmentation method is met, the cost of a contour of the object in the first image being a sum between a first value representing an energy internal to said contour and a second value representing an energy external to said contour, the energy external to said contour being a function of at least an energy dependent on a global motion of the object between the first image and the adjusted second image and an energy, referred to as the contour energy, corresponding to a sum of values of gradient moduli calculated for pixels in a second set of pixels belonging to the current contour of the object; a value representing the energy dependent on a global motion of the object between the first image and the second image being calculated in the form of a sum of differences between values representing pixels in a first set of pixels of the first image belonging to the current contour and values representing pixels situated at the same spatial positions as the pixels in the first set of pixels in the second image;

using the contour of the object thus obtained to estimate an item of information representing a global motion of the object; and applying to the first image an image restoration method using the estimated information representing the estimated global motion of the background and the estimated global motion of the object.

Using an external energy integrating an energy dependent on a global motion of the object makes it possible to take into account the motion of the object in the segmentation of the contour of the object. Advantage is thus taken of the correlations existing between two images in order to improve the segmentation.

In one embodiment, in order to calculate the value representing the energy internal to the current contour, a first local derivative and a second local derivative of the contour are calculated for pixels in a third set of pixels of the current image belonging to the current contour of the object, said value representing the internal energy being a function of said calculated derivatives.

In one embodiment, the first, second and third sets of pixels are identical, and each set comprises at least one subpart of the pixels of the current image belonging to the current contour of the object.

In one embodiment, during a first iteration of said method, an initial contour of the object in the current image is obtained from a final contour obtained during an application of the segmentation method to the reference image or from a contour specified by an operator in the reference image.

In one embodiment, during each estimation of an item of information representing a global motion, an item of information representing the form and the position of the object is obtained, said information representing the form and the position of the object being used for masking pixels that are not to be taken into account in said estimation.

In one embodiment, following the estimation of said item of information representing the global motion of the object, referred to as the first item of information, a filtering is applied to said first item of information in order to guarantee regular variations in the motion of the object between two successive images in the sequence of images, said filtering comprising the following steps: determining a first matrix for estimating a motion of the object in a reference frame centred on a barycentre of the object in the first image and a second matrix for estimating a motion of the object in a reference frame centred on a barycentre of the object in the adjusted second image; using the first and second matrices for calculating an item of information representing the motion of the object, referred to as the second item of information, from said first item of information; using the second item of information for obtaining a third matrix representing translation components of the motion of the object; using the second item of information and the third matrix for obtaining a fourth matrix representing components of the motion of the object other than the translation components; obtaining a filtered version of the third matrix, referred to as the filtered third matrix, by calculating a weighted sum between the third matrix and a filtered third matrix obtained when said method is implemented on the second image; obtaining a filtered version of the fourth matrix, referred to as the filtered fourth matrix, for calculating a weighted sum between the fourth matrix and a filtered fourth matrix obtained when the method is implemented on the second image; and obtaining an item of information representing a filtered global motion of the object by using the first and second matrices, the filtered third matrix and the filtered fourth matrix.

In one embodiment, the second item of information is calculated as follows:

$$\overline{dH_k^{Object}} = V_k^{-1} \cdot dH_k^{Object} \cdot V_{k-1}$$

where $V_k$ is the first matrix, $V_{k-1}$ is the second matrix, $dH_k^{Object}$ the first item of information and $\overline{dH_k^{Object}}$ the second item of information.

In one embodiment, the third matrix is calculated as follows:

$$H_k^t = \mathrm{Approx}T(V_k^{-1} \cdot dH_k^{Object} \cdot V_{k-1})$$

where $H_k^t$ is the third matrix and

ApproxT(X) is an approximation in translation of the homographic matrix X.

In one embodiment, the fourth matrix is calculated as follows:

$$H_k^h = H_k^{t-1} \cdot V_k^{-1} \cdot dH_k^{Object} \cdot V_{k-1}$$

where $H_k^h$ is the fourth matrix.

In one embodiment, the filtered third matrix is calculated as follows:

$$H_k^{t^{Filt}} = \alpha \cdot H_{k-1}^{t^{Filt}} + (1-\alpha) H_k^t$$

where $H_k^{t^{Filt}}$ is the filtered third matrix, $H_{k-1}^{t^{Filt}}$ is the filtered third matrix obtained when said method is implemented on the second image and α is a predefined constant lying between 0 and 1.

In one embodiment, the filtered fourth matrix is calculated as follows:

$$H_k^{h^{Filt}} = \beta \cdot I + (1-\beta) H_k^h$$

where $H_k^{h^{Filt}}$ is the filtered fourth matrix, I is an identity matrix and β is a predefined constant lying between 0 and 1.

In one embodiment, the item of information representing a filtered global motion of the object is calculated as follows:

$$dH_k^{Object^{Filt}} = V_k \cdot H_k^{t^{Filt}} \cdot H_k^{h^{Filt}} \cdot V_{k-1}^{-1}.$$

According to a second aspect of the invention, the invention relates to a device for restoring images in a sequence of images, comprising:

estimation means for estimating an item of information representing a global motion of a background of the first image with respect to a second image;

motion compensation means for compensating for the global motion of the background in the second image using said item of information representing the global motion of the background in order to obtain an adjusted version of the second image, referred to as the adjusted second image;

obtaining means for obtaining a contour of an object in the first image by applying a segmentation method, said segmentation method being iterative and comprising, during an iteration, a modification of a contour of the object in the first image obtained during a previous iteration of said segmentation method, referred to as the previous contour, so as to obtain a contour of the object in the first image, referred to as the current contour, such that a cost of the current contour is lower than a cost of the previous contour, a final contour of the object being obtained when a predefined condition for stoppage of said segmentation is met, the cost of a contour of the object in the first image being a sum between a first value representing an energy internal to said contour and a second value representing an energy external to said contour, the energy external to said contour being a function of at least an energy dependent on a global motion of the object between the first image and the adjusted second image and an energy, referred to as the contour energy, corresponding to a sum of values of gradient moduli calculated for pixels in a second set of pixels belonging to the current contour of the object; a value representing the energy dependent on a global motion of the object between the first image and the second image being calculated in the form of a sum of differences between values representing pixels in a first set of pixels of the first image belonging to the current contour and values representing pixels situated at the same spatial positions as the pixels in the first set of pixels in the second image;

motion estimation means using the contour of the object thus obtained to estimate an item of information representing a global motion of the object; and image restoration means using the information representing the estimated global motion of the background and the estimated global motion of the object.

According to a third aspect of the invention, the invention relates to a computer program, comprising instructions for implementing, by a device, the method according to the first aspect, when said program is executed by a processor of said device.

According to a fourth aspect of the invention, the invention relates to storage means, storing a computer program comprising instructions for implementing, by a device, the method according to the first aspect, when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context where the display system comprises an image acquisition device, a processing module and an image display device. The invention can however be implemented in a context where the image acquisition device, the processing module and the display device are separate and distant geographically. In this case, the image acquisition device, the processing module and the image display device comprise communication means for communicating with each other.

Moreover, the method according to the invention relies on an active contour based segmentation method based on contours. We show below that other types of active contour based segmentation methods can be used, such as for example the active contour based segmentation methods based on region, the segmentation methods based on implicit active contours based on level sets, etc.

In addition, the images used in the context of the invention are essentially monochrome images where each pixel of an image has only one component. The invention can however be applied to multicomponent images wherein each pixel of an image has a plurality of components.

Figure 1:
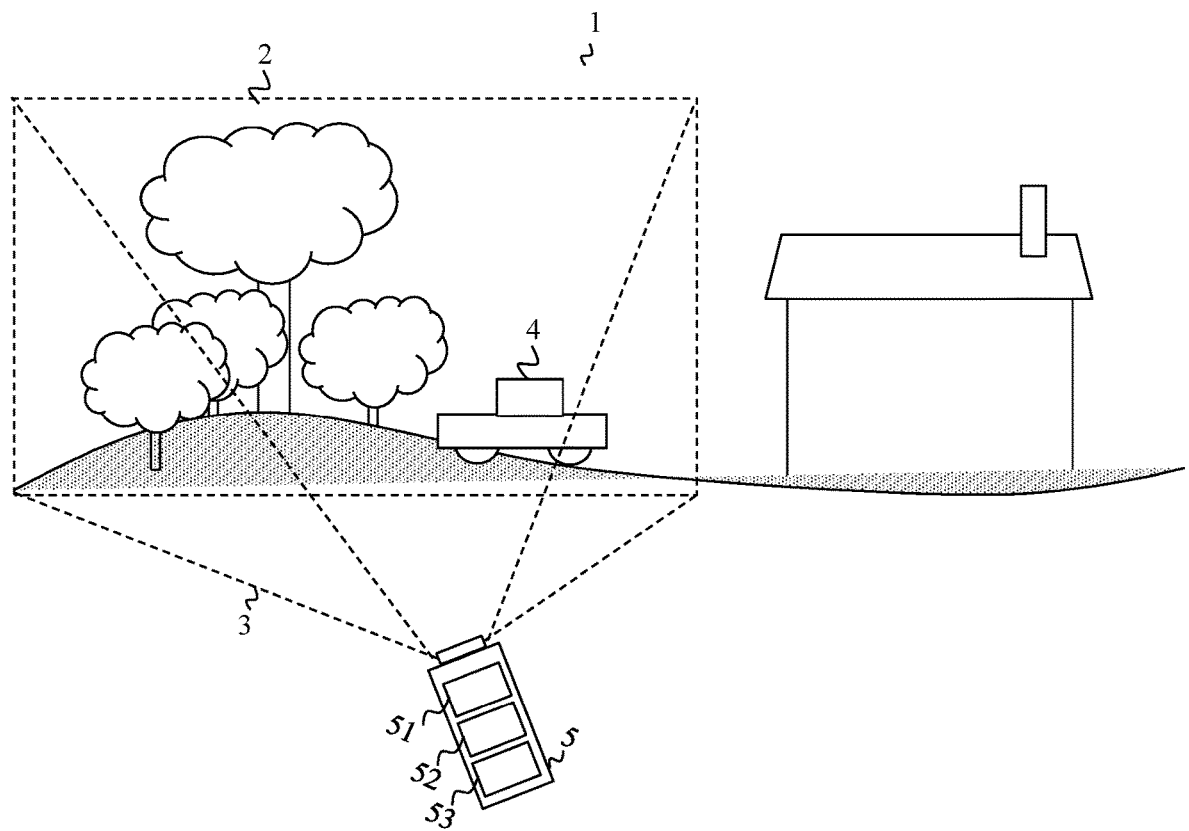
FIG. 1 illustrates schematically an example of context in which the invention can be implemented.

FIG. 1 illustrates schematically an example of context wherein the invention can be implemented.

In FIG. 1, a scene 1 is observed by a display system 5 in accordance with an optical field 3. The scene 1 comprises an object 4. The display system 5 comprises an image acquisition device 51, a processing module 52 able to implement an image restoration method and a segmentation method according to the invention, and an image display device 53. The image acquisition device 51 comprises an optical assembly and an image sensor such as for example a CCD (charge-coupled device) sensor or a CMOS (complementary metal-oxide-semiconductor) sensor. The image sensor supplies a sequence of images 2 representing the scene 1 in accordance with a predefined time frequency F (for example of F=25 to 50 images per second) to the processing module 52. After processing by the processing module 52, the processing module 52 supplies improved images to the image display device 53. The image display device 53 is for example a screen.

In one embodiment, the images supplied by the image acquisition device 51 are monochrome images.

In one embodiment, the images supplied by the image display device 51 are multicomponent images.

Figure 2:
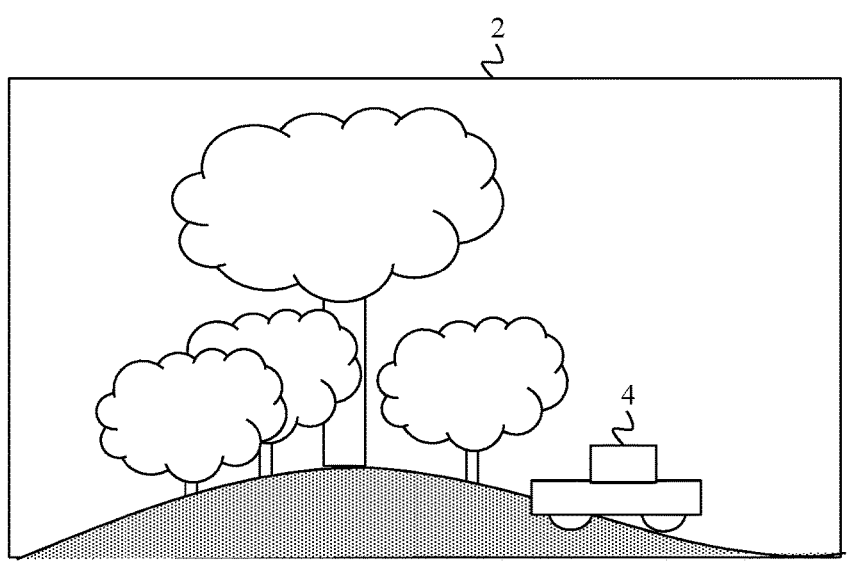
FIG. 2 illustrates schematically an example of an image containing an object and a background.

FIG. 2 illustrates schematically an example of an image containing an object and a background.

The example described in relation to FIG. 2 represents an image 2 supplied by the display system 5. In the image 2 there is the object 4 (here a vehicle) moving on a background (here a landscape). It can be imagined that the display system 5 is mobile so that the background has a motion.

Figure 3:
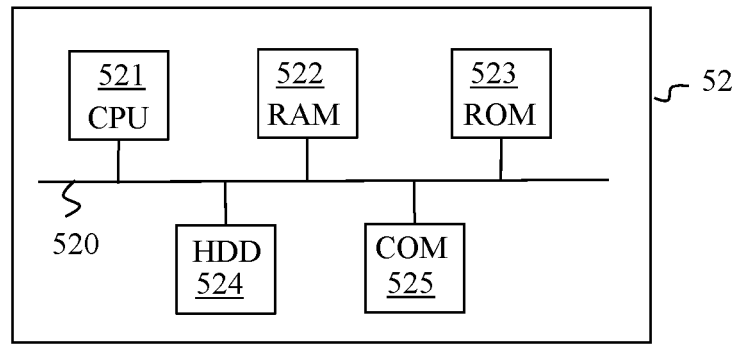
FIG. 3 illustrates schematically an example of hardware architecture of a processing module included in an image acquisition system.

FIG. 3 illustrates schematically an example of hardware architecture of the processing module 52 included in the display system 5.

According to the example of hardware architecture depicted in FIG. 3, the processing module 52 then comprises, connected by a communication bus 520: a processor or CPU (central processing unit) 521; a random access memory RAM 522; a read only memory ROM 523; a storage unit such as a hard disk or a storage medium reader, such as an SD (Secure Digital) card reader 524; at least one communication interface 525 enabling the processing module 52 to communicate with the image acquisition device 51 and/or the image display device 53.

In an embodiment in which the image acquisition device 51, the processing module 52 and the display device 53 are separate and distant, the image acquisition device 51 and the display device 53 also comprise a communication interface able to communicate with the communication interface 525 by means of a network such as a wireless network.

The processor 521 is capable of executing instructions loaded in the RAM 522 from the ROM 523, from an external memory (not shown), from a storage medium (such as an SD card), or from a communication network. When the processing module 52 is powered up, the processor 521 is capable of reading instructions from the RAM 522 and executing them. These instructions form a computer program causing the implementation, by the processor 521, of all or part of the method described below in relation to FIGS. 4 to 8.

The method described below in relation to FIGS. 4 to 8 can be implemented in software form by the execution of a set of instructions by a programmable machine, for example a DSP (digital signal processor), a microcontroller or a GPU (graphics processing unit), or be implemented in hardware form by a machine or a dedicated component, for example an FPGA (field-programmable gate array) or an ASIC (application-specific integrated circuit).

Figure 4:
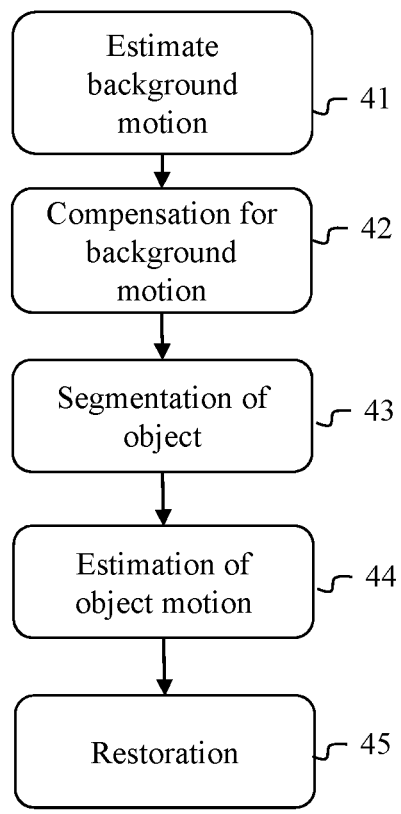
FIG. 4 illustrates schematically an image restoration method according to the invention.

FIG. 4 illustrates schematically an image restoration method according to the invention.

The method described in relation to FIG. 4 is an iterative method, implemented by the processing module 52 on each image in a sequence of images supplied by the image acquisition device 51, except for the first image in the sequence of images. Hereinafter, the term current image is given to an image in the course of processing by the processing module 52 and we denote the current image $I_k$, where k represents an index of an image. The index k indicates that the image $I_k$ appears in the sequence of images at an instant $T_0 + k \cdot \tau \cdot T_0$ corresponds to the start of the sequence of images (and therefore to the first image in the sequence, and $\tau = 1/F$. Let $I_{k-1}$ be an image, referred to as the previous image, immediately preceding the current image $I_k$ in the sequence of images supplied by the image acquisition device 51.

In a step 41, the processing module 52 estimates an item of information representing a global motion of a background of the current image $I_k$ (or motion of the background) with respect to the previous image $I_{k-1}$. The previous image $I_{k-1}$ is then a reference image for the current image $I_k$ for estimating the item of information representing the motion of the background. This step is implemented by a global motion estimation method. A global motion estimation makes the assumption that a set of pixels in any one image moves in the same way. This motion may be simple, such as a translation or rotation motion, or complex represented for example by an affine transformation or a homography. A homography is an eight-parameter projective transformation of coordinates. In one embodiment, the processing module considers that the motion of the background between two successive images in the sequence of images is represented by a homography. Let (x, y) be coordinates of a pixel $P_k^{Background}$ belonging to the background of the current image $I_k$ and (x', y') coordinates of the same pixel $P_{k-1}^{Background}$ belonging to the background of the previous image $I_{k-1}$. The estimation of the global motion made during the step 41 consists of determining the eight parameters of a homography making it possible to transform the coordinates (x', y') of each pixel $P_{k-1}^{Background}$ in the previous image $I_{k-1}$ in coordinates (x, y) of a pixel $P_k^{Background}$ in the current image $I_k$. By determining the eight parameters of the homography, an item of information is determined representing a global motion of the background between the previous image $I_{k-1}$ and the current image $I_k \cdot dH_k^{Background}$ denotes the homography representing the global motion of the background between the previous image $I_{k-1}$ and the image $I_k$.

In a step 42, the processing module 52 compensates for the motion of the background in the previous image $I_{k-1}$ in order to obtain an adjusted previous image $I_{k-1}^{adj}$. To do this, the processing module 52 applies the homography $dH_k^{Background}$ found during the step 41 to all the pixels of the previous image $I_{k-1}$.

In a step 43, the processing module 52 obtains a contour C of the object 4 by applying a segmentation method to the current image $I_k$. We describe hereinafter, in relation to FIGS. 5 and 6, a segmentation method according to the invention.

In a step 44, the processing module 52 estimates an item of information representing a global motion of the object 4, between the current image and a previous image. As during the step 41, the processing module 52 considers that the global motion of the object 4 is represented by a homography, denoted $dH_k^{Object}$. In one embodiment, the homography $dH_k^{Object}$ representing the global motion of the object 4 is obtained using the current image $I_k$ and the previous image $I_{k-1}$ and taking into account the motion of the background $dH_k^{Background}$ measured during the step 41. Let (x, y) be coordinates of a pixel $P_k^{Object}$ belonging to the object 4 in the current image $I_k$ and (x', y') coordinates of the same pixel $P_{k-1}^{Object}$ belonging to the object 4 in the previous image $I_{k-1}$. The estimation of global motion made during the step 44 comprises a determination of the eight parameters of a homography $dH_k^{measured}$ making it possible to transform the coordinates (x, y) of each pixel $P_k^{Object}$ in the current image $I_k$ in coordinates (x', y') of the pixel $P_{k-1}^{Object}$ in the previous image $I_{k-1}$. The following can be written:

$$dH_k^{Measured} = dH_k^{Object} \cdot dH_k^{Background}$$

The representative homography $dH_k^{Object}$ is then obtained as follows:

$$dH_k^{Object} = dH_k^{measured} \cdot (dH_k^{Background})^{-1}$$

In one embodiment, the homography $dH_k^{Object}$ representing the global motion of the object 4 is measured between an adjusted image and a non-adjusted image, which makes it possible not to involve the homography $dH_k^{Background}$. For example, the homography $dH_k^{Object}$ is measured between the adjusted previous image $I_{k-1}^{adj}$ and the current image $I_k$.

In a step 45, the processing module 52 applies an image restoration method to the current image $I_k$. In one embodiment, the image restoration method applied uses the information representing the global motion of the background and the information representing the global motion of the object 4 estimated in the steps 41 and 44 in order to match the pixels of the current image $I_k$ and the pixels of the previous image $I_{k-1}$. Let $P_k$ be a pixel of the current image $I_k$ and $P_{k-1}$ a pixel of the previous image $I_{k-1}$ matched with the pixel $P_k$ using the homographies $dH_k^{Background}$ and $dH_k^{Object}$. The pixel $P_k$ (and respectively the pixel $P_{k-1}$) has a non-zero positive integer number $N_c$ of components $C_i^{P_k}$ (and respectively $C_i^{P_{k-1}}$), $i \in [1; N_c]$. In this embodiment, the value $C_i^{P_k}$ of each component of each pixel $P_k$ of the image $I_k$ is replaced by a weighted sum calculated as follows:

$$C_i^{P_k} = \frac{W_k \cdot C_i^{P_k} + W_{k-1} \cdot C_i^{P_{k-1}}}{W_k + W_{k-1}}$$

where $W_k$ and $W_{k-1}$ are predefined weighting values. For example, the weightings $W_k$ and $W_{k-1}$ may be such that $W_k \leq W_{k-1}$.

In one embodiment, the image restoration method applied uses an image window comprising a number $N_I$ of images preceding the current image $I_k$. The pixels of each of the images are matched using the information representing the motion of the background and the motion of the object 4 obtained for each of the images in the image window.

In this embodiment, the value $C_i^{P_k}$ of each component of each pixel $P_k$ of the image $I_k$ is replaced by a weighted sum calculated as follows:

$$C_i^{P_k} = \frac{\sum_{j=1}^{N_I} W_j \cdot C_i^{P_j}}{\sum_{j=1}^{N_I} W_j}$$

where each $W_j$ is a predefined weighting value. It should be noted that the restoration method using a weighting involving two images is a particular case of the restoration method based on an image window where $N_I=2$.

In one embodiment, only the pixels of the current image $I_k$ belonging to the object 4 are restored.

In one embodiment, a plurality of restoration methods are used according to the object to which each pixel of the image $I_k$ belongs. A first restoration method is applied to the pixels belonging to the background of the current image $I_k$ and a second restoration method is applied to the pixels belonging to the object 4 in the current image $I_k$. The first restoration method is for example the restoration method using an image window wherein the image window comprises two images. The second restoration method is for example the restoration method using an image window wherein the image window comprises five images.

Figure 7:
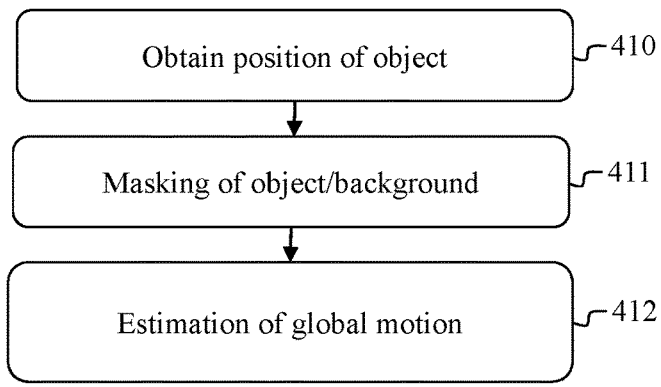
FIG. 7 illustrates schematically a global motion estimation method.

FIG. 7 illustrates schematically a global motion estimation method.

The method in FIG. 7 is applied by the processing module 52 in the step 41 in order to determine the global motion of the background (i.e. the homography $dH_k^{Background}$) and during the step 44 in order to determine the global motion of the object 4 (i.e. the homography $dH_k^{Object}$).

In the step 41, only the motion of the pixels corresponding to the background is sought. The motion of the pixels corresponding to the object 4 must now be taken into account.

In a step 410, the processing module obtains a position and a form of the object 4 in the image $I_k$.

In one embodiment, the form and the position of the object 4 in the image $I_k$ are given by an ordered list of pixels, referred to as control points, belonging to a contour C of the object 4. The ordered list of control points may comprise all the pixels belonging to the contour C of the object 4 or a subset of pixels of the contour C making it possible to obtain a good approximation of the contour C. Running through the ordered list of control points makes it possible to obtain the contour C.

In one embodiment, in the step 410, the processing module 52 makes an assumption of small motion of the object 4 between two successive images in the sequence of images. As stated above, the method described in relation to FIG. 4 is iterative so that, when the current image $I_k$ is being processed by this method, the previous image $I_{k-1}$ has already been processed by this method. The position and the form of the object 4 in the image $I_{k-1}$ are therefore known. By relying on the small-motion assumption, the processing module 52 considers that the form and the position of the object 4 in the image $I_k$ are identical to the form and the position of the object 4 in the image $I_{k-1}$. The processing module 52 therefore re-uses the ordered list of control points of the image $I_{k-1}$ in order to define the contour C in the image $I_k$.

The first image in the sequence $I_{k=0}$ is a particular case since this image is not preceded by any other image. In one embodiment, the position and the form of the object 4 in the first image $I_0$ in the sequence of images are given by an operator. To do this, the operator can outline the object 4 by means of a pointing device, such as a mouse, on the display device 53, which in this case is a touch screen. The background of the first image is considered to have a zero motion. Consequently the motion of the background has not been compensated for the first image in the sequence. The method described in relation to FIG. 4 is not applied to the first image $I_0$ in the sequence, but this image $I_0$ is used in this method for determining the motion of the background and the motion of the object 4 between this image $I_0$ and the image $I_{k=1}$ that follows it in the sequence of images.

In a step 411, the position and the form of the object in the current image $I_k$ being known, the processing module masks each pixel of the current image $I_k$ belonging to the object 4, i.e. the processing module masks each pixel belonging to the contour or internal to the contour of the object 4. In one embodiment, the processing module 52 associates each pixel of the current image $I_k$ with a first mask value when said pixel is masked and with a second mask value when said pixel is not masked. The first mask value is for example the value 1 and the second mask value is for example the value 0.

In a step 412, the processing module 52 estimates the global motion of the background between the current image $I_k$ and the previous image $I_{k-1}$ (i.e. the processing module 52 estimates the homography $dH_k^{Background}$). During this estimation only the pixels of the image $I_k$ that are not masked (i.e. the pixels associated with the second mask value) are taken into account. In addition, only the pixels of the previous image $I_{k-1}$ that are not masked are taken into account, using the mask obtained during the application of the method described in relation to FIG. 4 to the previous image $I_{k-1}$. In one embodiment, the determination of the eight parameters of the homography $dH_k^{Background}$ uses the projective fit method or the projective flow method described in the article "*Video Orbits of the Projective Group: a simple approach to featureless estimation of parameters*", Steve Mann and Rosalind W. Picard, *IEEE Tr. On Image Processing*, Vol. 6, No. 9, September 1997.

In the step 44, only the motion of the pixels corresponding to the object 4 is sought. The motion of the pixels corresponding to the background must not be taken into account.

In the step 44, the processing module performs the step 410 of obtaining the position and the form of the object 4. The position and the form of the object 4 in the current image $I_k$ are obtained by means of the result of the step 43.

In the step 411, the processing module 52 masks each pixel of the current image $I_k$ belonging to the background, i.e. not belonging to the object 4.

In the step 412, the processing module 52 estimates the motion of the object between the current image $I_k$ and the previous image $I_{k-1}$ (i.e. the processing module estimates the homography $dH_k^{measured}$ and then deduces therefrom the homography $dH_k^{Object}$). During this estimation only the pixels of the current image $I_k$ and of the previous image that are not masked are taken into account. Once again, the determination of the eight parameters of the homography $dH_k^{measured}$ uses the projective fit method or the projective flow method.

In one embodiment, when the step 410 is performed during the step 41, the processing module 52 makes an assumption of continuous motion of the object 4 in the sequence of images. The assumption of continuous motion means that the motion of the object 4 between the current image $I_k$ and the previous image $I_{k-1}$ is the same as the motion of the object 4 between the previous image $I_{k-1}$ and an image $I_{k-2}$ preceding the previous image $I_{k-1}$. The method described in relation to FIG. 4 being iterative, during the processing of the current image $I_k$, the motion of the object 4 between the previous image $I_{k-1}$ and the previous image $I_{k-2}$ is known. Moreover, the position and the form of the object 4 in the previous image $I_{k-1}$ are also known. The position and the form of the object 4 in the current image $I_k$ can therefore be found using a homography $dH_{k-1}^{measured} = dH_{k-1}^{Background} * dH_{k-1}^{Object}$ representing the motion of the object 4 between the previous image $I_{k-1}$ and the previous image $I_{k-2}$. The homography $dH_{k-1}^{measured}$ is a combination of a homography $dH_{k-1}^{Background}$ representing the motion of the background between the previous image $I_{k-1}$ and the previous image $I_{k-2}$ and a homography $dH_{k-1}^{Object}$ representing the motion of the object 4 between the previous image $I_{k-1}$ and the previous image $I_{k-2}$. The homography $dH_{k-1}^{measured}$ is applied to the object 4 in the previous image $I_{k-1}$. More precisely the homography $dH_{k-1}^{measured}$ is applied to the control points of the ordered list of control points representing the contour of the object 4 in the previous image $I_{k-1}$ in order to obtain the ordered list of control points representing the contour of the object 4 in the image $I_k$. The assumption of continuous motion is applicable when the step 410 is performed during the step 44.

In one embodiment, in order to take into account the fact that the small-motion and continuous-motion assumptions make it possible to obtain only an approximation of the form and the position of the object 4 in the current image $I_k$, an expansion is applied to the contour of the object 4 in the current image $I_k$. The expansion is obtained for example by using a mathematical morphology method.

In other embodiments, other known methods for estimating parameters of a homography can be used.

In other embodiments, the processing module considers that the motion between two successive images in the sequence of images is represented by other motion models such as a translation, a rotation, an affine transformation or a bilinear transformation.

In one embodiment, prior to each estimation of global motion (of the background or of the object formed), each image involved in the global motion estimation is interpolated to a half, a quarter or an eighth of a pixel. In this way, the precision of the global motion estimation is improved.

The projective fit method (and respectively the projective flow method) consists of finding, among a set of parameters of a motion model (here the eight parameters of a homography), the parameters of the motion model minimising a metric representing an error between a real motion of an object in an image and a motion of the object represented by the motion model. In the projective fit method (and respectively the projective flow method), each possible combination of parameters of the motion model is tested. Such an exhaustive method for the search for parameters of the motion model may have a high computing cost. It is possible to reduce the computing cost of the projective fit method (and respectively of the projective flow method) by using, for example, a gradient descent algorithm rather than an exhaustive search. However, a known problem with gradient descent methods is that, when the metric to be minimised has a plurality of local minima, the gradient descent method may converge towards a local minimum that is not a global minimum, i.e. that is not the minimum value that the metric can take. One method for ensuring a rapid convergence towards the global minimum of the metric consists of initialising the gradient descent method with a value close to the global minimum sought. In one embodiment, the exhaustive search for parameters of the motion model of the projective fit method (and respectively of the projective flow method) is replaced by a gradient descent method during the implementation of the step 412 during the steps 41 and 44.

When the step 41 is implemented on the image $I_k$, the gradient descent method is initialised to a value $dH_{k-1}^{Background}$ representing the motion of the background found for the image $I_{k-1}$. More precisely, the eight parameters of the homography $dH_{k-1}^{Background}$ representing the motion of the background between the previous image $I_{k-1}$ and the previous image $I_{k-2}$ are used for initialising the eight parameters of the homography $dH_k^{Background}$ representing the motion of the background between the current image $I_k$ and the previous image $I_{k-1}$ in the gradient descent method.

Likewise, when the step 44 is implemented on the image $I_k$, the gradient descent method is initialised to a value $(dH_{k-1}^{Object} * dH_k^{Background})$. More precisely, the eight parameters of the homography $(dH_{k-1}^{Object} * dH_k^{Background})$ are used for initialising the eight parameters of the homography $dH_k^{measured}$ representing the motion of the object 4 measured between the current image $I_k$ and the previous image $I_{k-1}$ in the gradient descent method. The homography $dH_k^{Object}$ is next deduced from the homography $dH_k^{measured}$ and the homography $dH_k^{Background}$.

Figure 8:
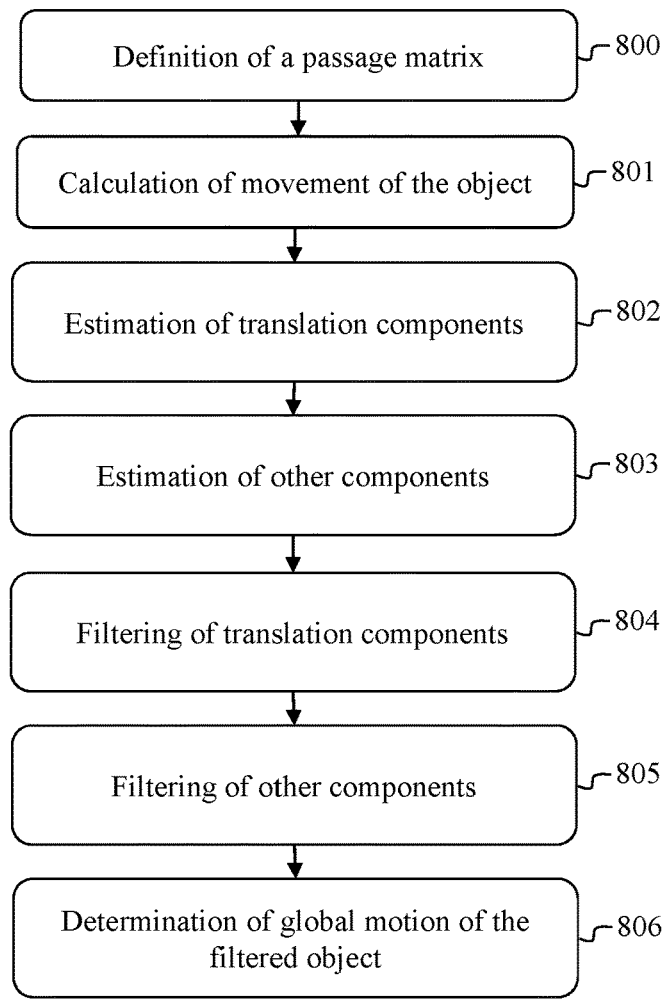
FIG. 8 illustrates schematically a motion filtering method.

In one embodiment, following the estimation of the information representing the motion of the object 4 between the current image $I_k$ and the adjusted previous image $I_{k-1}$ (i.e. following the estimation of the eight parameters of the homography $dH_k^{Oject}$), the information representing the estimated motion is filtered in order to guarantee regular variations of the motion of the object between two successive images in the sequence of images. The method described in relation to FIG. 4 is particularly effective when an assumption of inertial motion of the object 4 is satisfied. When the estimated information on motion of the object 4 is too variable, it is preferable to correct this information so that it is similar to motion information compatible with the inertial motion assumption. FIG. 8 describes a motion filtering method for correcting the motion information. The method described in relation to FIG. 4 then no longer uses the estimated motion information but the corrected estimated motion information.

FIG. 8 illustrates schematically a motion filtering method.

The method described in relation to FIG. 8 makes it possible to guarantee regular variations in the motion of the object 4 between two successive images in the sequence of images.

In a step 800, the processing module 52 determines a passage matrix $V_k$ (and respectively a passage matrix $V_{k-1}$) for estimating a motion of the object in a reference frame centred on a barycentre of the object 4 in the current image $I_k$ (and respectively in the adjusted previous image $I_{k-1}^{adj}$).

$$V_k = \begin{bmatrix} 1 & 0 & x_k^b \\ 0 & 1 & y_k^b \\ 0 & 0 & 1 \end{bmatrix}$$

$$V_{k-1} = \begin{bmatrix} 1 & 0 & x_{k-1}^b \\ 0 & 1 & y_{k-1}^b \\ 0 & 0 & 1 \end{bmatrix}$$

where $(x_k^b, y_k^b)$ (and respectively $(x_{k-1}^b, y_{k-1}^b)$) are coordinates of the barycentre of the object 4 in the current image $I_k$ (and respectively in the adjusted previous image $I_{k-1}^{adj}$).

In a step 801, the processing module 52 calculates information $\overline{dH_k^{Object}}$ representing the motion of the object 4 in the reference frame centred on the barycentre of the object 4.

$$\overline{dH_k^{Object}} = V_k^{-1} \cdot dH_k^{Object} \cdot V_{k-1} = \begin{bmatrix} . & . & T_x \\ . & . & T_y \\ . & . & . \end{bmatrix}$$

The coefficients of the matrix $\overline{dH_k^{Object}}$ denoted "." are coefficients that are not used hereinafter because of an approximation used during a following step 802.

In the step 802, the processing module 52 obtains a matrix $H_k^t$ representing translation components of the motion of the object 4 between the current image $I_k$ and the adjusted previous image $I_{k-1}^{adj}$ (represented by the homography $\overline{dH_k^{Object}}$) in the reference frame centred on the barycentre of the object 4 as follows:

$$H_k^t = ApproxT(V_k^{-1} \cdot dH_k^{Object} \cdot V_{k-1}) = \begin{bmatrix} 1 & 0 & T_x \\ 0 & 1 & T_y \\ 0 & 0 & 1 \end{bmatrix}$$

where $T_x$ and $T_y$ are parameters of a translation and ApproxT(X) is an approximation in translation of the homographic matrix X.

In a step 803, the processing module 52 obtains a matrix $H_k^h$ representing components of the motion of the object 4 between the current image $I_k$ and the adjusted previous image $I_{k-1}^{adj}$ other than the translation components as follows:

$$H_k^h = H_k^{t-1} \cdot V_k^{-1} \cdot dH_k^{Object} \cdot V_{k-1}$$

The components of the motion of the object 4 other than the translation components may for example be rotation, zoom, etc. components.

In a step 804, the processing module 52 filters the translation components of the motion of the object 4 between the current image $I_k$ and the adjusted previous image $I_{k-1}^{adj}$ as follows:

$$H_k^{Filt} = \alpha \cdot H_{k-1}^{Filt} + (1-\alpha) H_k^t$$

where $H_{k-1}^{Filt}$ is a matrix representing filtered translation components of the motion of the object 4 between the previous image $I_{k-1}$ and the adjusted previous image $I_{k-2}^{adj}$ and α is a predefined constant lying between 0 and 1. In one embodiment, α=0.8.

In a step 805, the processing module 52 filters the components of the motion of the object 4 between the current image $I_k$ and the adjusted previous image $I_{k-2}^{adj}$ other than the translation components as follows:

$$H_k^{h^{Filt}} = \beta \cdot I + (1-\beta) H_k^h$$

where $H_k^{h^{Filt}}$ is a matrix representing filtered components of the motion of the object 4 other than the translation components, I is an identity matrix of size 3×3 and β is a predefined constant lying between 0 and 1. In one embodiment β=0.5.

In a step 806, the processing module 52 determines an item of information $dH_k^{Object^{Filt}}$ representing the filtered global motion of the object 4 as follows:

$$dH_k^{Object^{Filt}} = V_k \cdot H_k^{Filt} \cdot H_k^{h^{Filt}} V_k^{-1}$$

In the embodiment wherein the estimated motion is filtered in order to guarantee small variations in the motion of the object between two successive images in the sequence of images, the filtered global motion of the object 4 represented by the filtered homography $dH_k^{Object^{Filt}}$ replaces the global motion of the object 4 represented by the homography $dH_k^{Object}$ when the current image $I_k$ is restored.

Figure 5:
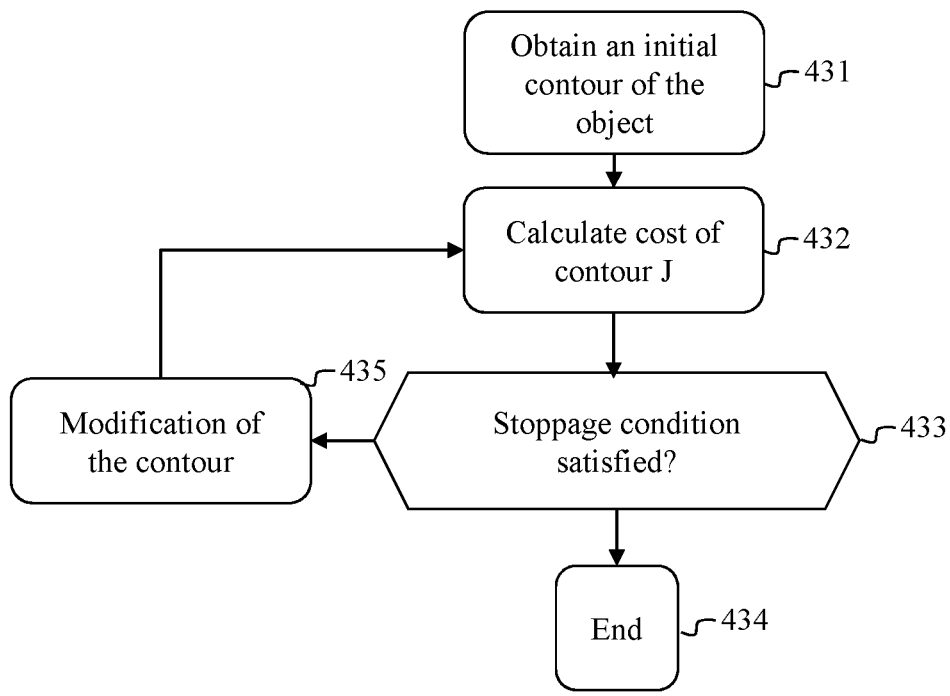
FIG. 5 illustrates schematically an image segmentation method according to the invention.

FIG. 5 illustrates schematically an image segmentation method according to the invention.

The method described in relation to FIG. 5 is implemented in the step 43. In one embodiment, the image segmentation method used during the step 43 is an active contour based segmentation method. A principle of active contour based segmentation methods is defining an initial contour in the vicinity of an object and then iteratively modifying this contour so that it best follows the form of the object. At each iteration, the contour of the object obtained during a previous iteration, referred to as the previous contour, is modified so as to obtain a contour of the object, referred to as the current contour, such that a cost of the current contour is less than a cost of the previous contour. In the active contour based segmentation method, the cost of a contour is dependent on an internal energy and an external energy of the contour. We give hereinafter examples of methods for calculating values representing an internal energy and an external energy of a contour. A final contour of the object is obtained when a predefined condition for stopping the active contour based segmentation method is fulfilled. A stop condition may for example be a maximum number of iterations or an obtaining of a difference between two costs of contours obtained in two successive iterations below a predefined threshold. It should be noted that, the closer the initial contour is to the real contour of the object, the more the active contour based segmentation method converges quickly to a contour close to the real contour of the object. A judicious choice of a position and a form of the initial contour therefore makes it possible to improve the performances of the active contour based segmentation method. In one embodiment the active contour based segmentation method is contour based.

In a step 431, the processing module 52 obtains an initial contour C of the object 4 in the current image $I_k$.

In one embodiment, during the step 431, the processing module 52 makes the assumption of a small motion of the object 4 between a current image $I_k$ and the previous image $I_{k-1}$. In this case, as at the performance of the step 411 during the step 44, the processing module 52 re-uses the ordered list of control points determined when the method described in relation to FIG. 4 is implemented on the previous image $I_{k-1}$ in order to obtain the initial contour C of the object in the current image $I_k$.

In a step 432, the processing module 52 calculates a cost of the current contour C by applying a method that we describe hereinafter in relation to FIG. 6. At the first iteration of the active contour based segmentation method described in relation to FIG. 5, the current contour C is the initial contour C.

In a step 433, the processing module 52 checks whether a condition for the stoppage of the active contour based segmentation method is fulfilled. In one embodiment, said iterative method stops when a number of iterations of the active contour based segmentation method reaches a maximum number of iterations.

When the stop condition is fulfilled, the active contour based segmentation method ends in the step 434 and the processing module 52 performs the step 44 already explained.

When the stop condition is not fulfilled, the processing module 52 implements a step 435. During the step 435, the processing module 52 implements a procedure for refinement of the contour C of the object 4 obtained during the preceding iteration of the active contour based segmentation method. During the step 435, the processing module 52 modifies the contour C of the object 4 obtained during the preceding iteration of the active contour based segmentation method, referred to as the previous contour, so as to obtain a contour C of the object, referred to as the current contour, such that a cost of the current contour is less than a cost of the previous contour. The modification of the contour C uses, for example, a method described in the article "Snakes: Active Contour Models" Michael Kass, Andrew Witkin, Demetri Terzopoulos, International Journal of Computer Vision, 321-331 (1988), 1987 Kluwer Academic Publishers, Boston.

The step 435 is followed by the step 432.

In one embodiment, in the step 431, the processing module makes the assumption of continuous motion of the object 4 between the current image $I_k$ and the previous image $I_{k-1}$. In this case, the processing module 52 moves the control points in the ordered list of control points in order to obtain the initial contour C of the object 4 in the current image $I_k$. These control points, determined when the method described in relation to FIG. 4 is implemented on the previous image $I_{k-1}$, are moved by the motion of the object 4 represented by the homography $dH_{k-1}^{Object} * dH_k^{Background}$.

In one embodiment, the control points in the ordered list of control points are moved by the filtered motion of the object 4 represented by the homography $dH_{k-1}^{Background} * dH_{k-1}^{Object^{filt}}$ in order to obtain the initial contour C of the object 4 in the current image $I_k$.

Figure 6:
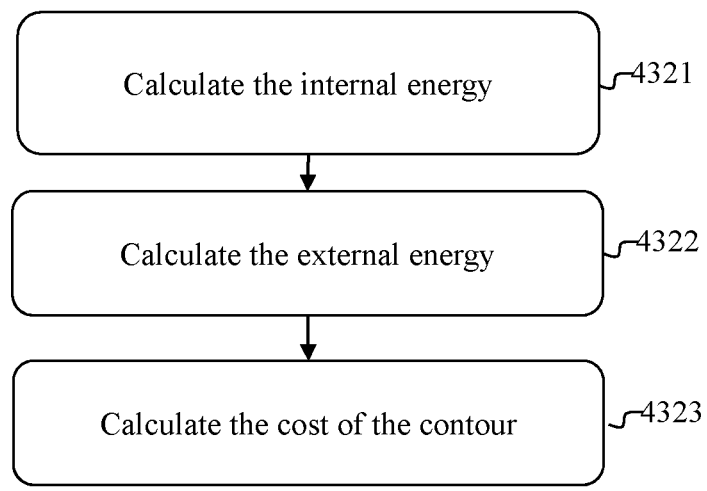
FIG. 6 illustrates schematically a method for calculating a cost of a contour of an object included in the segmentation method according to the invention.

FIG. 6 illustrates schematically a method for calculating a cost of a contour of an object included in the segmentation method according to the invention.

The method described in relation to FIG. 6 is implemented during the step 432. In a step 4321, the processing module 52 calculates an internal energy $E_{int}$ of the contour C as follows:

$$E_{int} = a. \sum_{i=1}^{N} |C'_{PC_i}|^2 + b. \sum_{i=1}^{N} |C''_{PC_i}|^2$$

where a and b are predefined constants equal for example to 0.01, N is a number of control points in the list of control points representing the curve C, $PC_i$ is the $i^{th}$ control point in the list of control points representing the curve C in the current image $I_k$, $C'_{PC_i}$ is a local first derivative of the curve C in the current image $I_k$ calculated at the control point $PC_i$, and $C''_{PC_i}$ is a local second derivative of the curve C in the current image $I_k$ calculated at the control point $PC_i$.

In a step 4322, the processing module 52 calculates an external energy $E_{ext}$ of the contour C as follows:

$$E_{ext} = -(W_{cont} \cdot E_{cont} + W_{mvt} \cdot E_{mvt})$$

where $W_{cont}$ and $W_{mvt}$ are predefined constants for example equal to 1. $E_{edge}$ is an energy, referred to as the contour energy, calculated on a gradient modulus image $I_k^{grad}$ obtained from the current image $I_k$:

$$E_{cont} = \sum_{i=1}^{N} I_k^{grad}(PC_i)$$

where $I_k^{grad}(PC_i)$ is a gradient modulus value of the image $I_k^{grad}$ corresponding to the position of the control point $PC_i$.

It should be noted that various methods for calculating a gradient modulus image are applicable here. In order to obtain the image of the gradient modulus $I_k^{grad}$ it is possible for example to apply to each pixel of the image $I_k$:
- a linear combination of pixels adjacent to said pixel, each adjacent pixel being weighted by a weight, the sum of said weights being equal to zero, and then calculating the amplitude (i.e. the modulus) of this linear combination;
- a Sobel filter;
- a Canny filter;
- etc.

In one embodiment, the image $I_k^{grad}$ is not calculated, and the gradient modulus values used in the calculation of the contour energy $E_{edge}$ are calculated solely at the positions of the end control points $PC_i$.

$E_{mvt}$ is an energy dependent on the motion of the object 4 between the current image $I_k$ and the preceding adjusted image $I_{k-1}^{adj}$:

$$E_{mvt} = \sum_{i=1}^{N} |I_k(PC_i) - I_{k-1}^{adj}(PC_i)|$$

where $I_k(PC_i)$ is a value of a pixel of a current image $I_k$ corresponding to the control point $PC_i$ and $I_{k-1}^{adj}(PC_i)$ is a value of a pixel of the image $I_{k-1}^{adj}$ situated at the same position as the pixel of the image $I_k$ corresponding to the control point $PC_i$.

In a step 4323, the processing module 52 calculates the cost J of the current contour C as follows:

$$J = E_{ext} + E_{int}$$

It is therefore found that the motion of the object 4 is taken into account in the segmentation method according to the invention, which makes it possible to obtain a better segmentation of the object. The minimisation of the cost J makes it possible to maximise $E_{mvt}$ and $k_{cont}$ on the control points of the contour, in order to favour the zones with high spatial and/or temporal gradients.

The principle of the invention remains the same in the case of a use of a type of active contour based segmentation method other than the contour based active contour based segmentation methods. Each active contour based segmentation method comprises an estimation of an external energy $E_{ext}$. However, since the active contour based segmentation methods are suited to fixed images, they do not take into account the motions in a sequence of images during segmentation. The invention makes it possible to take into account these motions by integrating an energy representing the motion in the estimation of the external energy $E_{ext}$. This principle applies to the external energies $E_{ext}$ calculated in the context of the region based active contour based segmentation methods and active contour based segmentation methods based on steps of levels.

Until now we have considered images comprising only one object. The invention applies when the images in the sequence of images comprise a plurality of objects. In the steps 41 to 42, each object is masked during the estimation and the compensation for the motion of the background in an image. The steps 43, 44 and 45 are implemented independently on each object.

Moreover, until now, we have considered that the object 4 was rigid and that consequently the apparent form of the object was approximately constant. In a real case, depending on the motions of the object and/or of the camera, the object may be seen from different viewing angles, which may cause deformations in the apparent form of the object. In one embodiment, where a variation in the form of the object on a plurality of successive images in the sequence of images exceeds a predefined threshold, the processing module 52 considers that the object appearing in the images has changed. In this case, when the processing module 52 detects a change of object, it considers that a new sequence of images is starting and invites the operator to outline the object again. In another embodiment, the processing module 52 applies the segmentation method described in relation to FIG. 5 whatever the variations in the form of the object, without requiring action by an operator.

In one embodiment, when the images supplied by the image acquisition device are multicomponent images, the processing module 52 applies the restoration method described in relation to FIG. 4 to each component independently. Each component can next be displayed independently or in combination with one or more other components on the display device 53.

In one embodiment, when the images supplied by the image acquisition device are multicomponent images, the processing module 52 applies the restoration method described in relation to FIG. 4 to at least one of the components, or to at least one component calculated from the components available in the images. Only the restoration step 45 is applied to each component independently using the information representing the motion of the background and the motion of the object 4 obtained during the preceding steps. Each component can next be displayed independently or in combination with one or more other components on the display device 53. For example, when the multicomponent images comprise a luminance component and two chrominance components, the restoration method described in relation to FIG. 4 is applied solely to the luminance component, the restoration step 45 being applied to the three components.

The invention claimed is:

1. A method for restoring images in a sequence of images comprising a first image and a second image preceding said first image, said first and second images comprising an object in motion on a background, wherein the method comprises, when it is applied to a first image in the sequence of images:

estimating an item of information representing a global motion of a background of the first image with respect to a second image;

compensating for a global motion of the background in the second image using said item of information representing the global motion of the background of the first image in order to obtain an adjusted version of the second image, referred to as an adjusted second image;

obtaining a contour of said object in the first image by applying a segmentation method, said segmentation method being iterative and comprising, during an iteration, a modification of the contour of the object in the first image obtained during a previous iteration of said segmentation method, referred to as a previous contour, so as to obtain the contour of the object in the first image, referred to as a current contour, such that a cost of the current contour is lower than a cost of the previous contour, a final contour of the object being obtained when a predefined condition for stoppage of said segmentation method is met, the cost of the contour of the object in the first image being a sum between a first value representing an energy internal to said contour of the object in the first image and a second value representing an energy external to said contour of the object in the first image, the energy external to said contour being equal to a weighted sum of an energy dependent on a global motion of the object between the first image and the adjusted second image and an energy, referred to as the contour energy, corresponding to a sum of values of gradient moduli calculated for pixels in a second set of pixels belonging to the current contour of the object;

a value representing the energy dependent on a global motion of the object between the first image and the second image being calculated in the form of a sum of differences between values representing pixels in a first set of pixels of the first image belonging to the current contour and values representing pixels situated at the same spatial positions as the pixels in the first set of pixels in the second image;

estimating an item of information representing a global motion of the object delimited by said contour obtained; and applying to the first image an image restoration method for replacing, for at least each pixel of the first image belonging to the object delimited by said contour obtained, each component of said pixel with a component equal to a weighted sum of said component of said pixel and of at least one component of a pixel of at least the second image matched with said pixel of the first image using the information representing the estimated global motion of the background and the estimated global motion of the object.

2. The method according to claim 1, wherein, in order to calculate the value representing the energy internal to the current contour, a first local derivative and a second local derivative of the contour are calculated for pixels in a third set of pixels of the current image belonging to the current contour of the object, said value representing the internal energy being a function of said calculated derivatives.

3. The method according to claim 2, wherein the first, second and third sets of pixels are identical, and each set comprises at least one subpart of the pixels of the current image belonging to the current contour of the object.

4. The method according to claim 1, wherein, during a first iteration of said method, an initial contour of the object in the current image is obtained from a final contour obtained during an application of the segmentation method to a reference image or from a contour specified by an operator in the reference image.

5. The method according to claim 1, wherein, during each estimation of an item of information representing a global motion, an item of information representing the form and the position of the object is obtained, said information representing the form and the position of the object being used for masking pixels that are not to be taken into account in said estimation.

6. The method according to claim 5, wherein, following the estimation of said item of information representing the global motion of the object, referred to as the first item of information, a filtering is applied to said first item of information in order to guarantee regular variations in the motion of the object between two successive images in the sequence of images, said filtering comprising the following steps:

- determining a first matrix for estimating a motion of the object in a reference frame centred on a barycentre of the object in the first image and a second matrix for estimating a motion of the object in a reference frame centred on a barycentre of the object in the adjusted second image;
- using the first and second matrices for calculating an item of information representing the motion of the object in said reference frame, referred to as the second item of information, from said first item of information;
- using the second item of information for obtaining a third matrix representing translation components of the motion of the object;
- using the second item of information and the third matrix for obtaining a fourth matrix representing components of the motion of the object other than the translation components;
- obtaining a filtered version of the third matrix, referred to as the filtered third matrix, by calculating a weighted sum between the third matrix and a previous filtered third matrix obtained when said method is implemented on the second image;
- obtaining a filtered version of the fourth matrix, referred to as the current filtered fourth matrix, by calculating a weighted sum between the fourth matrix and a previous filtered fourth matrix obtained when the method is implemented on the second image; and
- obtaining an item of information representing a filtered global motion of the object by using the first and second matrices, the current filtered third matrix and the current filtered fourth matrix.

7. The method according to claim 6, wherein the second item of information is calculated as follows:

$$\overline{dH_k^{Object}} = V_{k-1} \cdot dH_k^{Object} \cdot V_{k-1}$$

where $V_k$ is the first matrix, $V_{k-1}$ is the second matrix, $dH_k^{Object}$ the first item of information and $\overline{dH_k^{Object}}$ the second item of information.

8. The method according to claim 7, wherein the third matrix is calculated as follows:

$$H_k^t = \text{ApproxT}(V_k^{-1} \cdot dH_k^{Object} \cdot V_{k-1})$$

where $H_k^t$ is the third matrix and ApproxT(X) is an approximation in translation of a homographic matrix X.

9. The method according to claim 8, wherein the fourth matrix is calculated as follows:

$$H_k^h = H_k^{t-1} \cdot V_k^{-1} \cdot dH_k^{Object} \cdot V_{k-1}$$

where $H_k^h$ is the fourth matrix.

10. The method according to claim 9, wherein the current filtered third matrix is calculated as follows:

$$H_k^{t\,Filt} = \alpha \cdot H_{k-1}^{t\,Filt} + (1-\alpha) H_k^t$$

where $H_k^{t\,Filt}$ is the current filtered third matrix, $H_{k-1}^{t\,Filt}$ is the previous filtered third matrix obtained when said method is implemented on the second image and $\alpha$ is a predefined constant lying between 0 and 1.

11. The method according to claim 10, wherein the current filtered fourth matrix is calculated as follows:

$$H_k^{h\,Filt} = \beta \cdot I + (1-\beta) H_k^h$$

where $H_k^{h\,Filt}$ is the current filtered fourth matrix, I is an identity matrix and $\beta$ is a predefined constant lying between 0 and 1.

12. The method according to claim 11, wherein the item of information representing a filtered global motion of the object is calculated as follows:

$$dH_k^{Object\,Filt} = V_k \cdot H_k^{t\,Filt} \cdot H_k^{h\,Filt} \cdot V_{k-1}^{-1}.$$

13. A device for restoring images in a sequence of images comprising a first image and a second image preceding said first image, said first and second images comprising an object in motion on a background, wherein the device comprises, when it is applied to a first image in the sequence of images electronic circuitry for:

- estimating an item of information representing a global motion of a background of the first image with respect to a second image;
- compensating for a global motion of the background in the second image using said item of information representing the global motion of the background of the first image in order to obtain an adjusted version of the second image, referred to as an adjusted second image;
- obtaining a contour of said object of the first image by applying a segmentation method,
- said segmentation method being iterative and comprising, during an iteration, modifying the contour of the object in the first image obtained during a previous iteration of said segmentation method, referred to as a previous contour, so as to obtain the contour of the object in the first image, referred to as a current contour, such that a cost of the current contour is lower than a cost of the previous contour, a final contour of the object being obtained when a predefined condition for stoppage of said segmentation method is met, the cost of the contour of the object in the first image being a sum between a first value representing an energy internal to said contour of the object in the first image and a second value representing an energy external to said contour of the object in the first image, the energy external to said contour being equal to a weighted sum of an energy dependent on a global motion of the object between the first image and the adjusted second image and an energy, referred to as the contour energy, corresponding to a sum of values of gradient moduli calculated for pixels in a second set of pixels belonging to the current contour of the object; a value representing the energy dependent on a global motion of the object between the first image and the second image being calculated in the form of a sum of differences between values representing pixels in a first set of pixels of the first image belonging to the current contour and values representing pixels situated at the same spatial positions as the pixels in the first set of pixels in the second image;
- estimating an item of information representing a global motion of the object delimited by said contour obtained; and
- applying an image restoration method for applying to the first image an image restoration method for replacing, for at least each pixel of the first image belonging to the object delimited by said contour obtained, each component of said pixel with a component equal to a weighted sum of said component of said pixel and of at least one component of a pixel of at least the second image matched with said pixel of the first image using the information representing the estimated global motion of the background and the estimated global motion of the object.

14. A non transitory storage medium storing a computer program comprising instructions for implementing, by a device, the method according to claim 1, when said program is executed by a processor of said device.

\* \* \* \* \*